(12) United States Patent
Goss et al.

(10) Patent No.: US 9,167,115 B1
(45) Date of Patent: *Oct. 20, 2015

(54) METHODS AND SYSTEMS FOR TRANSFERRING INFORMATION BETWEEN A MOVABLE SYSTEM AND ANOTHER SYSTEM

(71) Applicant: Marvell International Technology Ltd., Hamilton (BM)

(72) Inventors: Steven M. Goss, Corvallis, OR (US); Gregory F. Carlson, Corvallis, OR (US); Ronald G. Paul, Corvallis, OR (US); Todd A. McClelland, Corvallis, OR (US); Randall L. Stockberger, Independence, OR (US); Jerry A. Marshall, Corvallis, OR (US)

(73) Assignee: Marvell International Technology Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,345

(22) Filed: Dec. 2, 2013

Related U.S. Application Data

(63) Continuation of application No. 13/716,684, filed on Dec. 17, 2012, now Pat. No. 8,596,536, which is a continuation of application No. 12/836,758, filed on Jul. 15, 2010, now Pat. No. 8,333,324, which is a continuation of application No. 11/300,797, filed on Dec. 15, 2005, now Pat. No. 7,770,794.

(51) Int. Cl.
*G06K 7/08* (2006.01)
*G06K 7/10* (2006.01)
(Continued)

(52) U.S. Cl.
CPC ............ *H04N 1/0083* (2013.01); *G06F 3/1211* (2013.01); *G06F 3/1236* (2013.01); *H04N 1/00278* (2013.01); *H04N 1/032* (2013.01)

(58) Field of Classification Search
CPC ........ B41J 11/002; B41J 15/044; B41J 11/68; B41J 11/70; B41J 15/04; B41J 2002/14435; B41J 15/042; B41J 15/02; B41J 2002/14491; B41J 2202/19; B41J 2202/20; B41J 2/14427; H04N 1/32133; H04N 1/00204; H04N 1/00244; H04N 1/00392; H04N 1/00968; H04N 1/32122; H04N 1/32778; H04N 2201/3247; H04N 2201/3269; H04N 2201/327; H04N 1/3258; H04N 2201/0082; G06K 2207/1011; G06K 2207/1018; G06K 7/10811; G06K 7/1092; G06K 9/00463; G06K 9/3233; G06F 21/445; G06F 21/606; G06F 21/73

See application file for complete search history.

(56) References Cited

U.S. PATENT DOCUMENTS 4,617,596 A   10/1986   Yoshida et al.
5,029,020 A   7/1991    Norder et al.
(Continued)

OTHER PUBLICATIONS

Shepler, J. "How Bluetooth cuts the cords," Mar. 5, 2005 Available at www.searchmobilecom(2uting. techtarget. com/generic/O,295582, sid40 gci 1067872,00 .html.
(Continued)

*Primary Examiner* — Thien T Mai

(57) ABSTRACT

An image forming apparatus, which may be a printer, includes an image acquisition subsystem and a processing subsystem. The image acquisition subsystem includes an imager and a source. The imager is configured to scan an image while the image acquisition subsystem moves with respect to the image forming apparatus and configured to provide electrical signals including information related to the scanned image. The source is configured to emanate electromagnetic radiation based on the electrical signals. The processing subsystem includes a receiving component configured to receive the electromagnetic radiation emanated from the source of the image acquisition subsystem. The image forming apparatus also includes a structure supporting both the image acquisition subsystem and the processing subsystem.

20 Claims, 2 Drawing Sheets

(51) Int. Cl.
*H04N 1/00* (2006.01)
*G06F 3/12* (2006.01)
*H04N 1/032* (2006.01)

(56) References Cited

U.S. PATENT DOCUMENTS

| | | | |
|---|---|---|---|
| 5,051,838 A | 9/1991 | Cho et al. |
| 5,093,879 A | 3/1992 | Bregman et al. |
| 5,172,243 A | 12/1992 | Hayashi et al. |
| 5,402,156 A | 3/1995 | Donahue et al. |
| 5,402,251 A | 3/1995 | Ogasawara et al. |
| 5,574,804 A | 11/1996 | Olschafskie et al. |
| 5,577,026 A | 11/1996 | Gordon et al. |
| 5,595,445 A | 1/1997 | Bobry |
| 5,600,445 A | 2/1997 | Omi |
| 5,610,387 A | 3/1997 | Bard et al. |
| 5,812,179 A | 9/1998 | Pensavecchia et al. |
| 5,874,722 A | 2/1999 | Rando et al. |
| 6,061,159 A | 5/2000 | Walsh |
| 6,081,629 A | 6/2000 | Browning |
| 6,229,565 B1 | 5/2001 | Bobry |
| 6,278,101 B1 | 8/2001 | Puyot |
| 6,405,926 B1 | 6/2002 | Yomogida et al. |
| 6,422,100 B1 | 7/2002 | Li et al. |
| 6,442,403 B1 | 8/2002 | Becot et al. |
| 6,446,871 B1 | 9/2002 | Buckley et al. |
| 6,476,849 B1 | 11/2002 | Kerr et al. |
| 6,595,423 B2 | 7/2003 | Cho et al. |
| 6,603,464 B1 | 8/2003 | Rabin |
| 6,611,363 B1 | 8/2003 | Yannai et al. |
| 6,853,293 B2 | 2/2005 | Swartz et al. |
| 6,891,979 B2 | 5/2005 | Hu et al. |
| 7,312,924 B2 | 12/2007 | Trissel |
| 7,364,082 B2 | 4/2008 | Harel et al. |
| 7,457,007 B2 | 11/2008 | Silverbrook et al. |
| 8,596,536 B1 * | 12/2013 | Goss et al. ............ 235/451 |
| 2002/0017567 A1 | 2/2002 | Connolly et al. |
| 2002/0194075 A1 | 12/2002 | OHagan et al. |
| 2003/0046097 A1 | 3/2003 | LaSalle et al. |
| 2003/0053513 A1 | 3/2003 | Vatan et al. |
| 2003/0117670 A1 | 6/2003 | Brugger et al. |
| 2004/0051752 A1 | 3/2004 | Asauchi et al. |
| 2007/0285652 A1 | 12/2007 | Nielsen et al. |

OTHER PUBLICATIONS

Esener, S. et al. "Present and Future Needs of Free-Space Optical Interconnects," IPDPS Workshops 2000, pp. 1104-1119, Available at www.iodos.cc.aatech.edu/2000/wocs/18001109.pdf.

Yuceturk, E., et al. "Comparative study of very short distance electrical and optical interconnects based on channel characteristics," Optics in Computing (Trends in Optics and Photonics Series vol. 90), Optical Soc. of America, pp. 7-9 (Jun. 2003).

N. Savage, "Optical Interconnets: Fiber and free space create circuits," Laser Focus World, Jan. 2000.

I. O'Connor, "Optical Solutions for System Level Interconnects," SLIP'04, Feb. 14-15, 2004, Paris, France.

M.J. Kobrinsky et al., "On-Chip Optical Interconnects," Intel Technology Journal 8(2), May 10, 2004, pp. 129-142.

M. Sasaki et al., "A Wireless Chip Interconnect Using Resonant Coupling Between Spiral Inductors," Available at www.rcis.hiroshima-.u.ac.ip/21coe/E/4resultlresult2-_1.html.

M.F. Chang et al. "RFIWireless Interconnect for inter- and Intra-Chip Communications," Proceedings of the IEEE 89(4), Apr. 2001, pp, 456-466.

R. Kolic, "An introduction to Wireless USB (WUSB)," Available at www.deviceforae.com/articles/AT9015145687.html (Feb. 21,2004).

* cited by examiner

METHODS AND SYSTEMS FOR TRANSFERRING INFORMATION BETWEEN A MOVABLE SYSTEM AND ANOTHER SYSTEM

This present disclosure is a continuation of U.S. patent application Ser. No. 13/716,684, filed Dec. 17, 2012 (now U.S. Pat. No. 8,596,536), which is a continuation of U.S. patent application Ser. No. 12/836,758 (now U.S. Pat. No. 8,333,324), filed Jul. 15, 2010, which is a continuation of U.S. patent application Ser. No. 11/300,797 (now U.S. Pat. No. 7,770,794) filed Dec. 15, 2005, wherein the entirety of each are incorporated herein by reference.

BACKGROUND OF THE INVENTION

Technical Field

Many systems (such as, for example, scanners, printers, and recording devices) include, within the system enclosure, a movable subsystem and another subsystem, where the two subsystems transfer information.

A typical example is the image acquisition subsystem in a scanner and the processing subsystem. In such an example, the image acquisition subsystem includes an image acquisition device that acquires a scanned image. The scanned image data has to be transferred to the processing subsystem. However, typically the image acquisition subsystem moves over the item to be scanned. In conventional systems, a flexible cable connects the image acquisition subsystem to the processing subsystem. In applications where the data rate of the information being transferred between the two subsystems is high, the presence of a long cable can result in signal degradation and the cable itself to serve as a source of radiofrequency interference, either by transmitting or receiving radiofrequency interference. The continued motion of the cable can also result in quality problems.

Furthermore, although in recent years there has been significant effort in reducing the impedance of connections, there are practical (such as cost) and physical limits to the decrease in the impedance of connections. The impedance of the connection is a factor in the degradation of the signal in a long connection.

The above described problems are typical of a movable subsystem connected to another subsystem by a flexible cable. There it is, therefore, a need for a more reliable method of connecting a movable subsystem to another subsystem.

BRIEF SUMMARY OF THE INVENTION

One embodiment of the system of this invention includes a movable subsystem operatively connected to a structure. In one instance, the movable subsystem includes an electrical component capable of providing electrical signals, where the electrical signals comprise information, a source of electromagnetic radiation, and a modulating component capable of receiving the electrical signals and of modulating the source of electromagnetic radiation, wherein the modulated electromagnetic radiation comprises the information. One embodiment of the system of this invention also includes another subsystem operatively connected to the structure, where the other subsystem includes a receiving component capable of receiving electromagnetic radiation emanating from the source of electromagnetic radiation and of converting the received electromagnetic radiation into other electrical signals, and another electrical component capable of receiving the other electrical signals. In a further embodiment, the movable subsystem also includes a receiving component and the other subsystem also includes a source of electromagnetic radiation and a modulating component.

For a better understanding of the present invention, together with other and further needs thereof, reference is made to the accompanying drawings and detailed description and its scope will be pointed out in the appended claims.

DETAILED DESCRIPTION OF THE INVENTION

Unless defined otherwise below, all technical and scientific terms used herein have the same meaning as commonly understood by one of ordinary skill in the art to which this invention belongs. Still, certain terms are defined herein for the sake of clarity.

The following definitions are provided for specific terms that are used in the following written description.

The term "RF signals," as used herein, refers to the portion of the electromagnetic radiation spectrum below $10^{12}$ Hz (below 1000 GHz).

The term "optical signal," as used herein, refers to the portion of the electromagnetic radiation spectrum above $10^{11}$ Hz (infrared and above, including visible, ultraviolet, x-ray radiation and above).

The term "electrical signal," as used herein, refers to a signal that is transmitted by means of wired connections.

The term "imager," as used herein, refers to a device that converts optical signals into electrical signals and enables the acquiring of electrical signals representing an image.

Figure 1:
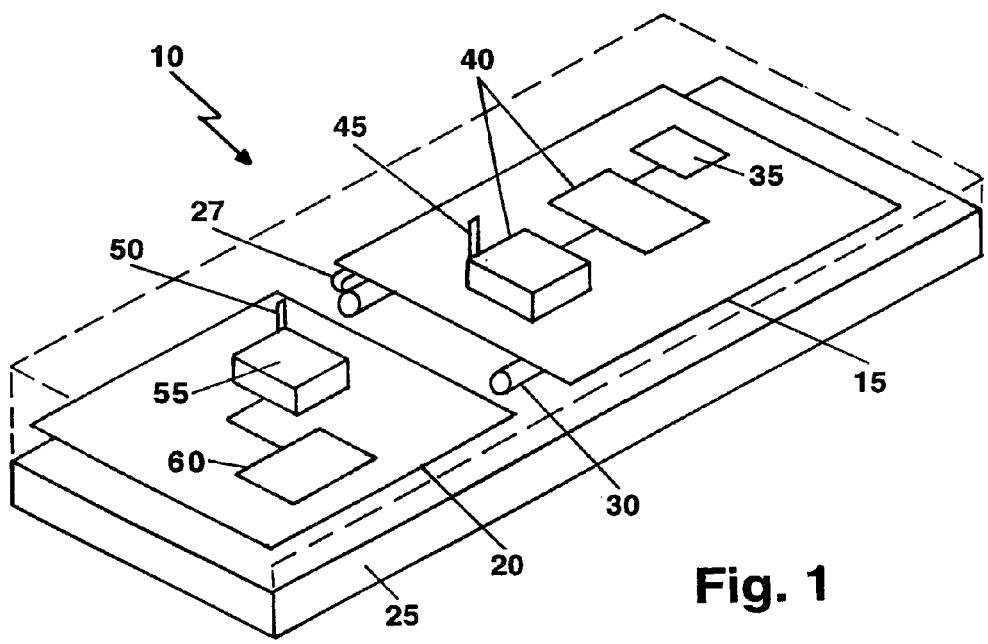
FIG. 1 is a pictorial schematic description of an embodiment of the system of this invention.

An embodiment 10 of the system of this invention is shown in FIG. 1. Referring to FIG. 1, the embodiment 10 shown therein includes a movable subsystem 15 and another subsystem 20, which in the embodiment shown is a fixed subsystem. The movable subsystem 15 is operatively connected to the structure 25. In the embodiment shown in FIG. 1, two support rails 30 are attached to the structure 25. In one embodiment, the system of this invention not being limited only to this embodiment, the movable subsystem 15 is movably mounted on the two support rails 30 by means of rollers 27. In other embodiments (not shown), the movable subsystem 15 may be coupled to a lead screw, which is driven by a motor attached to the structure 25, or, the movable subsystem 15 may be attached to a cam follower that moved on a cam driven by a motor attached to the structure 25. (The above are only a few of the many possible mechanical designs for a movable subsystem operatively connected to a structure.) The movable subsystem 15 includes an electrical component 35 capable of providing electrical signals, where the electrical signals carry information. In one embodiment the electrical component is an imager, such as, but not limited to, a CCD or CMOS imager, that receives image optical information and converts it to image electrical information. The electrical information originating at the electrical component 35 can be received at a modulating component 40. The modulating component 40 is capable of modulating a source of electromagnetic radiation 45 so that the electromagnetic radiation emitted by the source 45 carries the information that was carried by the electrical signals. In the embodiment shown in FIG. 1, the source of electromagnetic radiation is an antenna 45. The modulating component 40, when the source of electromagnetic radiation is an antenna, is a modulator/transmitter (a conventional component in radio/RF systems).

The other subsystem 20 in FIG. 1 includes a receiving component 50 that is capable of receiving the electromagnetic radiation emitted by the source 45. In the embodiment shown in FIG. 1, the receiving component 50 is another antenna 50 connected to a receiver 55. The other antenna 50 converts the electromagnetic radiation received from the source 45 into modulated electrical signals. The receiver 55 demodulates the modulated electrical signals and provides the demodulated electrical signals to another electrical component 60. The information that was carried by the modulated electromagnetic radiation emitted by the source 45 is carried by the demodulated electrical signals received by the other electrical component 60.

In the embodiment shown in FIG. 1, the source 45 and the receiving component 50 are substantially collinear. In embodiments in which the source 45 and the receiving component 50 are substantially collinear, the source 45 and the receiving component 50 are substantially aligned with respect to which other. There are embodiments of this invention in which the source 45 and the receiving component 50 are substantially aligned with respect to each other without being collinear.

In the embodiment in which the source of electromagnetic radiation is an antenna and the receiving component is another antenna, embodiments in which the source antenna is substantially omnidirectional do not have to be necessarily aligned. The decision to select an embodiment where the source and the receiving component are aligned involves considerations of cost, power requirements, and electromagnetic interference and compatibility.

In embodiments, such as the embodiment 10 shown in FIG. 1, in which the source 45 and the receiving component 50 are RF antennae, the modulating component 40 and the receiver/demodulator can be selected so that they conform to one of the many available standards. Present-day standards include Bluetooth, WiFi (IEEE 802.11) and quasi-standards such as UWB or wireless USB. Embodiments of the system of this invention conforming to any of these standards are within the scope of this invention.

In another embodiment, the source 45 and the receiving component 50 emit and receive radiation by near Field coupling, where such coupling can be capacitive or inductive. Such embodiments of the system of this invention are also within the scope of this invention. In embodiments based on near Field coupling, the distinction between the source 45 and the receiving component 50 is blurred and both the source 45 and the receiving component 50 can be considered as generalized near Field antennas. In some embodiments utilizing near Field coupling a same component can be both a source and a receiving component.

Figure 2:
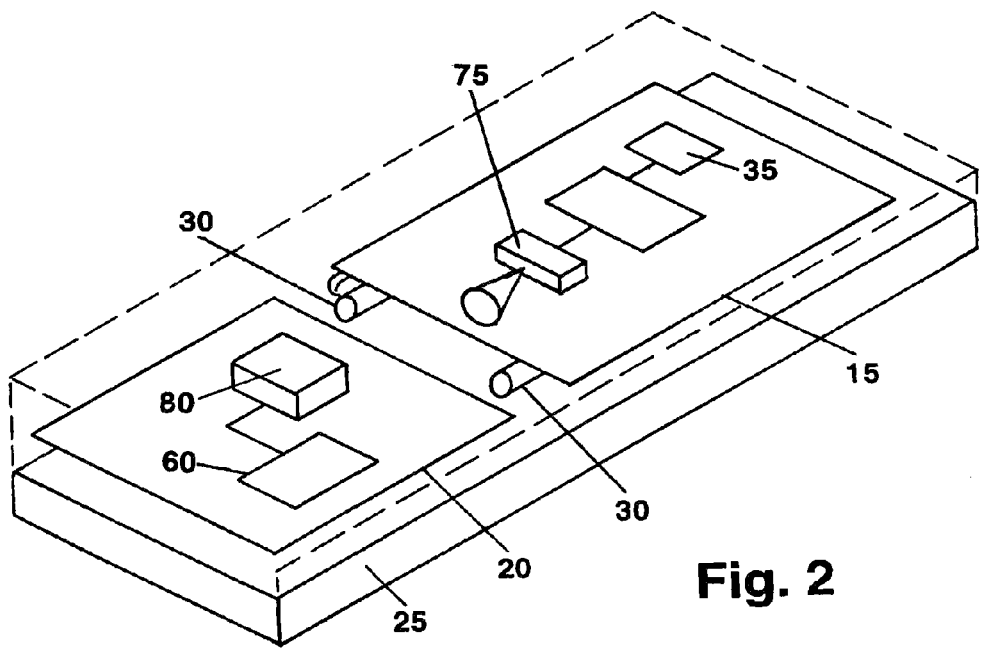
FIG. 2 is a pictorial schematic description of another embodiment of the system of this invention.

An embodiment in which the source of electromagnetic radiation is an optical source and the receiving component is a detector is shown in FIG. 2. Components in FIG. 2 that are similar to components in FIG. 1 are labeled with the same numerical label as the corresponding component in FIG. 1. The optical source 75 in FIG. 2 can be, in one embodiment, but is not limited to, a VCSEL (vertical Cavity Surface emitting Laser) or any other form of a laser diode or LED. The detector 80 can be one of the many possible optical detectors (for example, but not limited to, one of the detectors described in E. L. Dereniak, D. G. Crowe, Optical radiation Detectors, ISBN 0-471-89797-3, 1984). In some embodiments, the receiving component may also include a demodulator.

It should be noted that, in embodiments utilizing an optical source, the optical source may include optical elements to collimate, focus, or otherwise modify the emitted optical beam and that the detector may include optical elements to collimate, focus, or otherwise modify the received optical beam.

Exemplary embodiments of the system of this invention include embodiments in which the movable subsystem 15 is a scanning subsystem and the electrical component 35 is an imager. In conventional scanners, the scanning subsystem is electrically connected to other subsystems by means of a cable (typically, a flexible cable) with a service loop.

Figure 3:
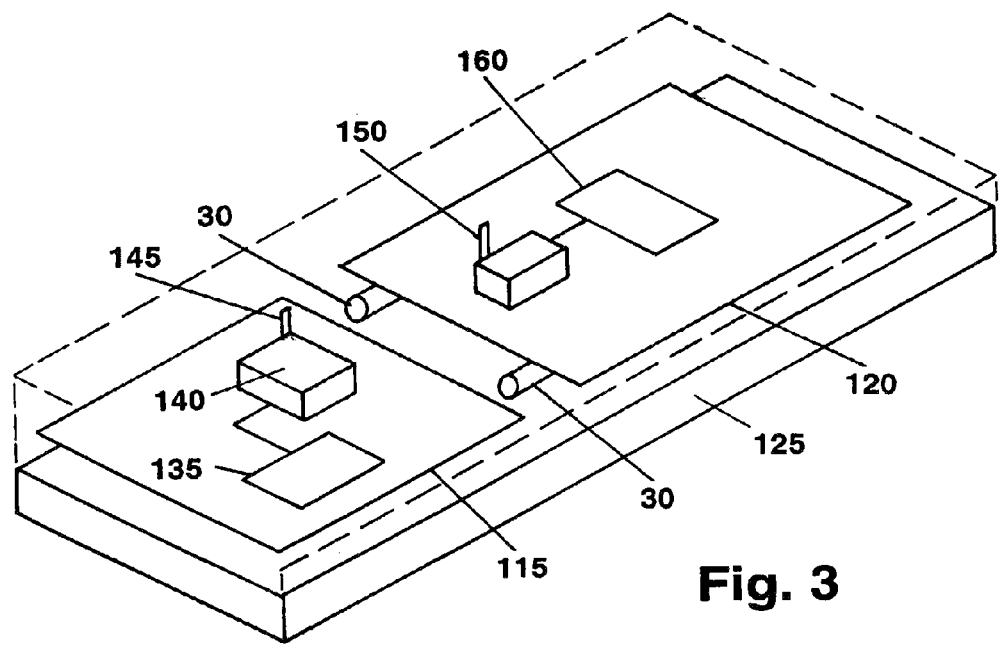
FIG. 3 is a pictorial schematic description of yet another embodiment of the system of this invention.

An embodiment of the system of this invention in which the electrical component capable of providing the electrical signals is located in another subsystem, which is a subsystem attached to the structure, is shown in FIG. 3. Referring to FIG. 3, a subsystem 115 is attached to the structure 125. The subsystem 115 includes an electrical component 135 capable of providing electrical signals where the electrical signals carry information, a modulating component 140 that receives the electrical signals and modulates a source of electromagnetic radiation 145. The modulated electromagnetic radiation carries the information. A movable subsystem 120 includes a receiving component 150 that receives the modulated electromagnetic radiation and converts the modulated electromagnetic radiation into other electrical signals and another electrical component 160 that receives the electrical signals obtained from demodulating the electromagnetic radiation. The movable subsystem 120 is operatively connected to the structure 125. The operative connection may be, but is not limited to, one of the embodiments described hereinabove. In the embodiment shown in FIG. 3, the source 145 of electromagnetic radiation is an antenna 145 and the receiving component 150 includes another antenna and a receiver. In other embodiments, the source 145 of electromagnetic radiation can be an optical source and the receiving component 150 can include an optical detector. Note that the source 145 and the receiving component can be substantially aligned with each other or substantially collinear.

An exemplary embodiment of the system shown in FIG. 3 is a printer in which the print head is located in the movable subsystem 120. Print information is generated by the electrical component 135 and has to be transmitted to the printing component 160.

Figure 4:
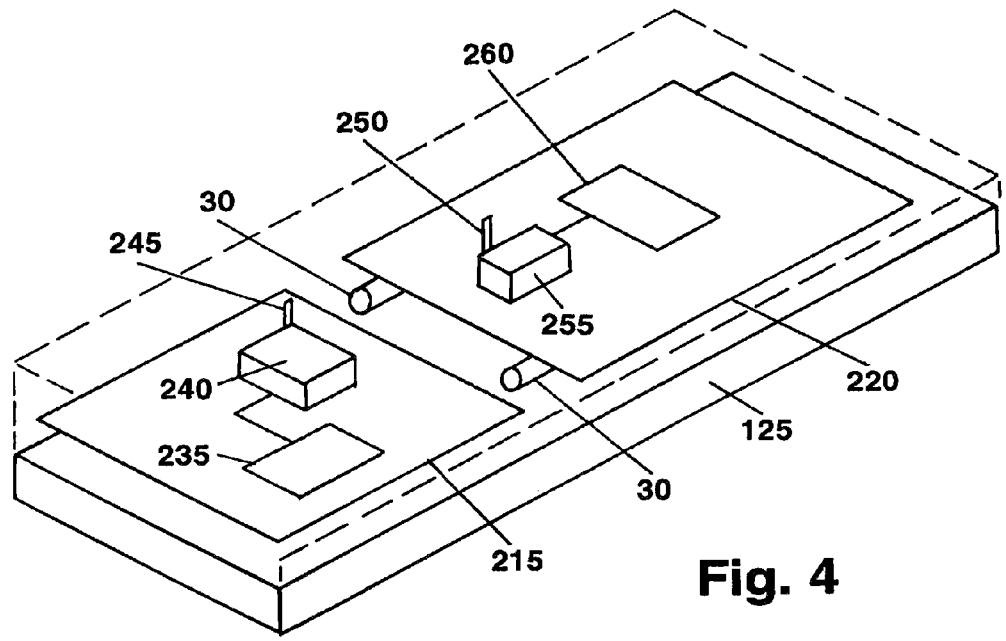
FIG. 4 is a pictorial schematic description of a further embodiment of the system of this invention.

It should be noted that embodiments that combine the features of the embodiment shown in FIGS. 1 and 3 are also within the scope of this invention. In embodiments such as the embodiment shown in FIG. 4, the mobile subsystem 220 includes a transmitting/receiving antenna 250, a transceiver 255 and an electrical component 260. The other subsystem 215 includes another transmitting/receiving antenna 245, another transceiver 240 and another electrical component 235. It should be noted that the transmitting/receiving antenna 250, 245 can be antennas and the transceiver 240, 255 can be a receiver and a separate modulator. Thus, the antennas 245, 250 and their corresponding transceivers 240, 255 can act as either sources of electromagnetic radiation or as receiving components, wherein the transceivers act as modulating components when their corresponding antenna acts as a source of electromagnetic radiation.

During operation of the embodiments of the system this invention, electrical signals that carry information are converted into modulated electromagnetic radiation, where the modulated electromagnetic radiation also carries the information. The modulated electromagnetic radiation is propagated between a movable subsystem and another subsystem. The propagated electronic radiation is received and then converted back into electrical signals. In that manner at the information is carried by electrical signals initially, by electromagnetic radiation after the electromagnetic radiation is modulated by the electrical signals, and finally the information is carried again by electrical signals which are obtained by demodulating the electromagnetic radiation. In the embodiments of the system of this invention, the movable system is operatively connected to a structure and the other system is also operatively connected to the same structure.

Although, in the embodiments shown hereinabove, one subsystem is a movable subsystem and the other subsystem is a fixed subsystem, embodiments in which both subsystems are movable are within the scope of this invention.

Although the invention has been described with respect to various embodiments, it should be realized this invention is also capable of a wide variety of further and other embodiments within the spirit and scope of the appended claims.

What is claimed is:

1. A receiver utilized with a printing device to receive a wireless data signal, comprising:
    a receiving component supported by a movable component and configured to receive the wireless data signal transmitted from a transmitter, the wireless data signal including print information; and
    a processing component supported by the movable component and configured to process the print information within the wireless data signal to facilitate a printing component to perform a printing operation, wherein the movable component is driven along a rail system while the printing component performs the printing operation.

2. The receiver of claim 1, wherein the wireless data signal follows a Bluetooth or IEEE 802.11 standard.

3. The receiver of claim 1, wherein the receiving component and the transmitter are aligned collinearly with respect to each other.

4. The receiver of claim 1, wherein the receiving component comprises a transceiver antenna.

5. The receiver of claim 1, wherein the printing component is comprised of a print head.

6. The receiver of claim 1, wherein the movable component is further configured to support a scanning component.

7. The receiver of claim 1, wherein the processing component is configured to process the print information within the wireless data signal by modulating the print information into a format that facilitates the printing component to perform the printing operation.

8. A method for receiving a wireless data signal within a printing device, comprising:
    receiving, at a receiver, a wireless data signal including print information from a transmitter, wherein the receiver is physically supported by a movable component that is driven along a rail system;
    processing, by a processing component, the print information included in the wireless data signal to facilitate a printing operation; and
    controlling, by the processing component, a printing component to perform the printing operation based on the processed print information, wherein the printing component is supported by the movable component as the movable component is driven along the rail system during the printing operation.

9. The method of claim 8, wherein the printing component is comprised of a print head.

10. The method of claim 8, wherein the movable component is further configured to support a scanning component.

11. The method of claim 8, wherein processing the print information comprises modulating the print information into a format that facilitates the printing component to perform the printing operation.

12. A receiver in communication with a scanning component, comprising:
    a receiving component supported by a housing of a scanning device and configured to receive a wireless data signal including image information transmitted from the scanning component, wherein a movable component comprising the scanning component is driven along a rail system while the scanning component obtains the image information during a scanning process; and
    a processing component supported by the housing of the scanning device and configured to process the image information within the wireless data signal.

13. The receiver of claim 12, wherein the scanning component is one of a laser, a laser diode, or an LED.

14. The receiver of claim 12, wherein the wireless data signal is transmitted according to near-field coupling, RF communication, or optical communication.

15. The receiver of claim 12, wherein the receiving component comprises an antenna.

16. A method for transmitting image information within a scanning device, comprising:
    obtaining the image information by scanning an image, by a scanner, as the scanner moves with respect to a receiver, wherein the scanner comprises a movable component being driven along a railing system;
    transmitting a wireless data signal to the receiver; and
    receiving, at the receiver, the wireless data signal including the image information transmitted by a transmitter in communication with the scanner, wherein the receiver is physically supported by a support structure of the scanning device.

17. The method of claim 16, wherein the scanner is an optical scanner and obtaining the image information comprises obtaining an optical signal including the image information from the scanner.

18. The method of claim 17, further comprising:
    converting the optical signal including the image information into the wireless data signal including the image information, wherein the wireless data signal is an electrical signal.

19. The method of claim 17, wherein the wireless data signal is comprised of the optical signal including the image information.

20. The method of claim 16, wherein the scanner is one of a laser, a laser diode, or an LED.

* * * * *